United States Patent [19]

Cichy

[11] 4,337,085
[45] Jun. 29, 1982

[54] RECOVERY OF PRECIOUS METALS FROM SPENT ALUMINA-CONTAINING CATALYSTS

[75] Inventor: Paul Cichy, Buffalo, N.Y.

[73] Assignee: Kennecott Corporation, Stamford, Conn.

[21] Appl. No.: 192,285

[22] Filed: Sep. 30, 1980

[51] Int. Cl.$^3$ ............................................. C22B 11/00
[52] U.S. Cl. .................................. 75/83 R; 75/10 R; 75/65 R
[58] Field of Search ................... 75/10 R, 65 R, 68 R, 75/83

[56] References Cited

U.S. PATENT DOCUMENTS

| | | | |
|---|---|---|---|
| 545,001 | 8/1895 | Van Cleve | 75/83 |
| 2,828,200 | 3/1958 | Nixon | 75/83 |
| 2,860,045 | 11/1958 | Nixon | 75/83 |
| 3,469,971 | 9/1969 | Leopard | 75/83 |
| 3,694,190 | 9/1972 | Langston | 75/65 R |
| 3,951,648 | 4/1976 | Stern | 75/83 |
| 4,029,495 | 6/1977 | Hirayama | 75/83 |
| 4,142,871 | 3/1979 | Zeiringer | 75/83 |

OTHER PUBLICATIONS

Cichy "Fused Aluminum Production", *Electric Furnace Proceedings*, pp. 162-175 (1971).

*Primary Examiner*—P. D. Rosenberg
*Attorney, Agent, or Firm*—Paul A. Leipold; R. Lawrence Sahr

[57] ABSTRACT

The invention relates to the recovery of precious metals which is accomplished by melting an alumina-containing spent catalyst having therein a minor amount of a precious metal. The melted alumina containing carrier material is heated to about 2100° C. in an electric furnace. The alumina material is poured from the furnace for utilization in abrasives manufacture. The precious metal collects in the bottom of the furnace and is either poured off and allowed to solidify or allowed to solidify in the furnace. In one embodiment of the invention, the steps of melting spent catalyst and heating to form a molten mixture is repeated a multiplicity of times with pouring off of the molten carrier material. As a multiplicity of meltings and pourings are carried out, gradually there is an appreciable accumulation of the precious metals in the bottom of the furnace.

16 Claims, 4 Drawing Figures

MOLD COOLING METHOD

MOLD COOLING METHOD

MELT TRANSFER LADLE METHOD

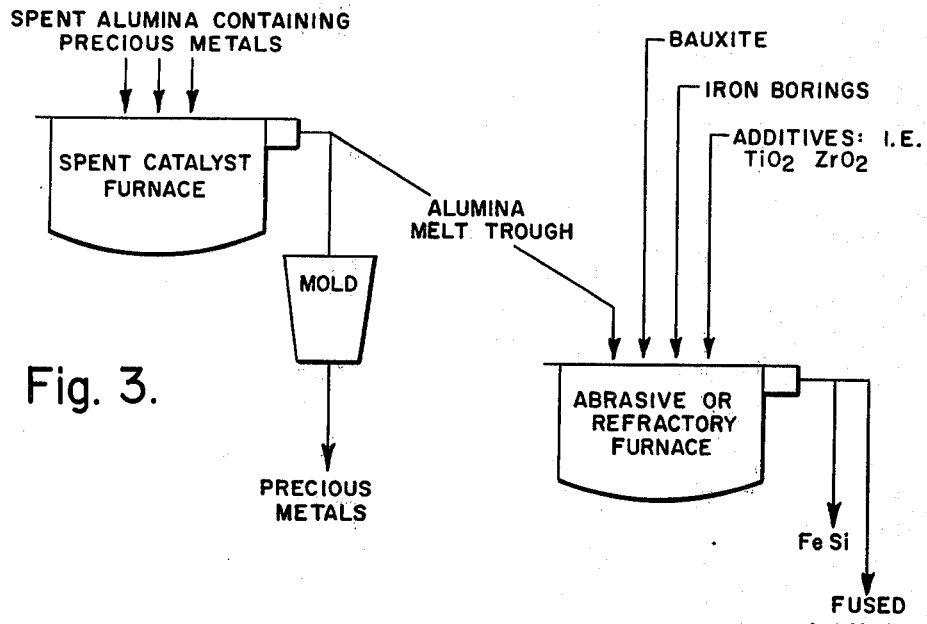
DIRECT MELT TRANSFER METHOD BY MEANS OF A TROUGH
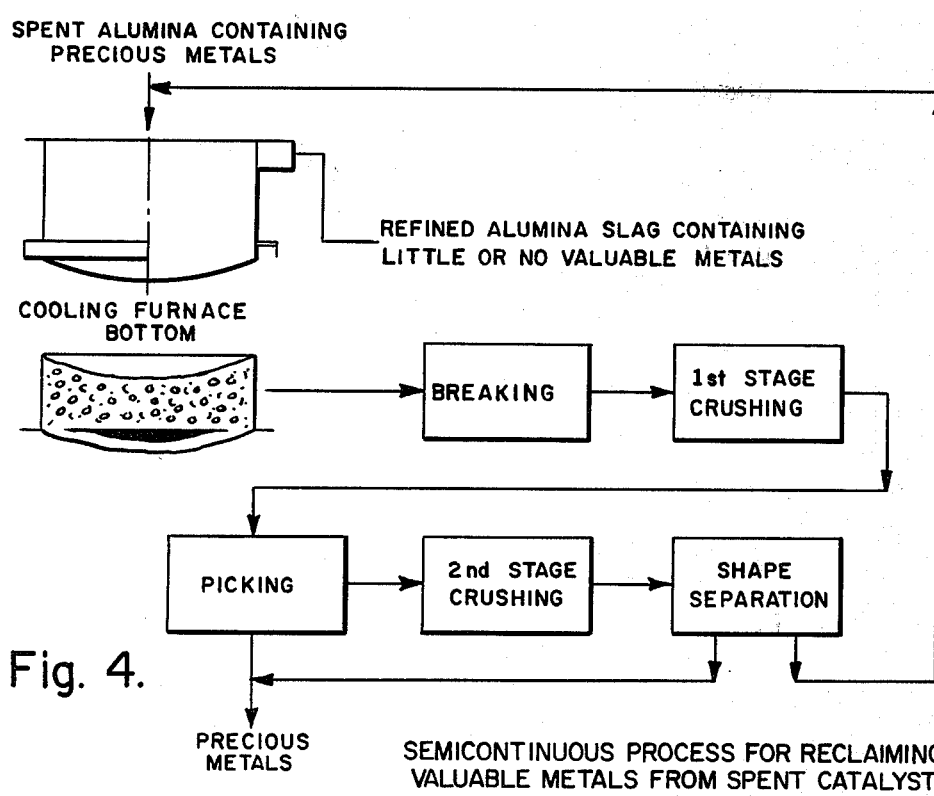
SEMICONTINUOUS PROCESS FOR RECLAIMING VALUABLE METALS FROM SPENT CATALYSTS

RECOVERY OF PRECIOUS METALS FROM SPENT ALUMINA-CONTAINING CATALYSTS

TECHNICAL FIELD

This invention relates to the recovery of precious metals from spent catalyst materials, particularly those containing alumina.

BACKGROUND ART

The present invention relates to a process for recovering precious metals from spent catalyst materials. Generally, in chemical industries, especially in the petrochemical industry, petroleum refining industry and the soap and detergent industry, a great amount of precious metal catalysts such as platinum and palladium are used. Further, the catalytic converter pollution control devices required on automobiles in recent years have contained precious metal catalysts such as platinum and palladium. These catalysts are generally employed in the form of supported catalysts wherein the precious metal is carried on the surface of a support or carrier composed of an inorganic ceramic material of an oxide such as aluminum oxide, silicon oxide, magnesium oxide, calcium oxide, zirconium oxide or combinations thereof. There exists a need for economical processes for completely recovering the precious metal catalytic components from spent catalysts. Recovery of such materials both provides for recycling of valuable components and reduces the potential environmental pollution caused by their disposal.

Several prior processes for recovering precious metals have been proposed which utilize leaching processes for recovery of the precious metal. These processes generally comprise a leaching process that removes the catalytic material by its chemical combination with another material in the gaseous or liquid phase. Representative of such processes may be considered U.S. Pat. No. 3,951,648 to Stern et al and U.S. Pat. No. 2,860,045 to Nixon et al and U.S. Pat. No. 3,469,971 to Leopard. These processes have the disadvantages that the precious metals are not totally recovered, the carrier for the precious metal is not utilized for another purpose and the materials used in the recovery are expensive and environmentally difficult to handle.

U.S. Pat. No. 4,142,871 to Zeiringer discloses a process for utilizing spent catalysts in a process which combines the formation of alumina abrasives with the recovery of nickel or cobalt materials from the catalysts. The Zeiringer process melts the catalyst material containing the heavy metal, cools the material and mechanically separates the alumina-containing melt component from the metal alloy residue.

U.S. Pat. No. 4,029,495 to Hirayama also discloses a process for separating heavy metal materials such as nickel and cobalt from spent catalyst support materials. In the process, the spent catalyst material is heated to a sintering temperature to cause aggregation of the metal component. The mixture then may be either crushed and separated or further heated to from 1480° to 1580° C. to separate the molten heavy metal phase and a second melted phase comprising the carrier. The carrier may be separated by pouring off the top layer for use in formation of ceramic fibers and pouring the bottom layer into a mold to form ingots.

There remains a need for an economical process of separating precious metals from carrier materials. There is particularly needed a method of separating, economically, very low concentrations of these metals such as 0.2% to about 0.01%. Further, there is a need for a process which enables utilization of spent catalysts for recovery of precious metals without creating waste materials which must be disposed of after precious metal recovery.

DISCLOSURE OF THE INVENTION

An object of this invention is to overcome disadvantages of prior processes for recovery of precious metals.

It is a further object of this invention to provide an economical means of recovery of very low concentrations of precious metals from ceramic carrier materials.

It is another further additional object of this invention to provide a source of low-cost alumina for use in forming abrasive grain and fused-cast refractories.

These and other objects of the invention generally are accomplished by melting an alumina-containing spent catalyst having therein a minor amount of a precious metal. The melted alumina containing carrier material is heated to about 2100° C. in an electric furnace. The alumina material is poured from the furnace for utilization in abrasives manufacture. The precious metal collects in the bottom of the furnace and is either poured off and allowed to solidify or allowed to solidify in the furnace. Depending on the exact composition of the material remaining in the furnace, the metal may be poured as ingots or crushed and recovered by picking out of the precious metal reguli by hand. The precious metal containing material recovered may also be treated by the known leaching processes to recover purer precious metal.

In a particularly preferred form of the invention, the steps of melting spent catalyst and heating to form a molten mixture is repeated a multiplicity of times with pouring off of the molten carrier material. As a multiplicity of meltings and pourings are carried out, gradually there is an appreciable accumulation of the precious metals in the bottom of the furnace. After sufficient precious metal has accumulated, the metal is poured into molds or allowed to solidify in the furnace bottom for recovery by breaking up and crushing of the cooled base of the furnace. The method of utilizing multiple melts makes possible the economic recovery of precious metals that exist in only very small proportions of the material such as between about 0.1% and about 0.01% of the spent catalyst material. It even makes possible the recovery of precious metals from the spent alumina carrier materials scrapped after the conventional chemical extraction of precious metals.

BRIEF DESCRIPTION OF THE DRAWINGS

FIG. 3 is an illustration in flow sheet form of a semi-continuous spent catalyst recovery system wherein the alumina melt is dumped in a trough from the spent catalyst furnace into the abrasive or refractory furnace and the valuable metals are periodically poured into a mold for cooling and separation.

FIG. 4 is an alternative method of recovery of precious metals wherein rather than being poured from the furnace and cooled the valuable metal containing material in the furnace is cooled in the furnace and then the furnace bottom is treated to recover the precious metals.

BEST MODE FOR CARRYING OUT THE INVENTION

The system of the invention has numerous advantages over prior methods of recovering precious metals. The system allows utilization of both the precious metals recovered and the alumina material which may be used as abrasive or refractory cast material. Further, the system of the instant invention does not require the utilization of reducing agent as the temperatures are so high that they are not required as most of the precious metal oxides formed are decomposed below 1500° C. Another advantage is that the system is suitable both for recovering very minute amounts of about 0.01% in the feed material and also suitable for recovering precious metals that are present in amounts such as 10% of the feed material which are recoverable by other processes. These and other advantages of the process will become apparent from the description below. The instant system contemplates melting of spent alumina catalyst material in an electric furnace. The electric furnace preferred is of the arc type, however, other electric furnace types may be used such as resistance and reduction furnaces. Upon melting, the alumina and precious metals will separate with the precious metals being heavier passing to the bottom of the furnace. The system of the invention contemplates several different embodiments for recovery of the precious metals that collect on the bottom of the furnace after melting.

Figure 1:
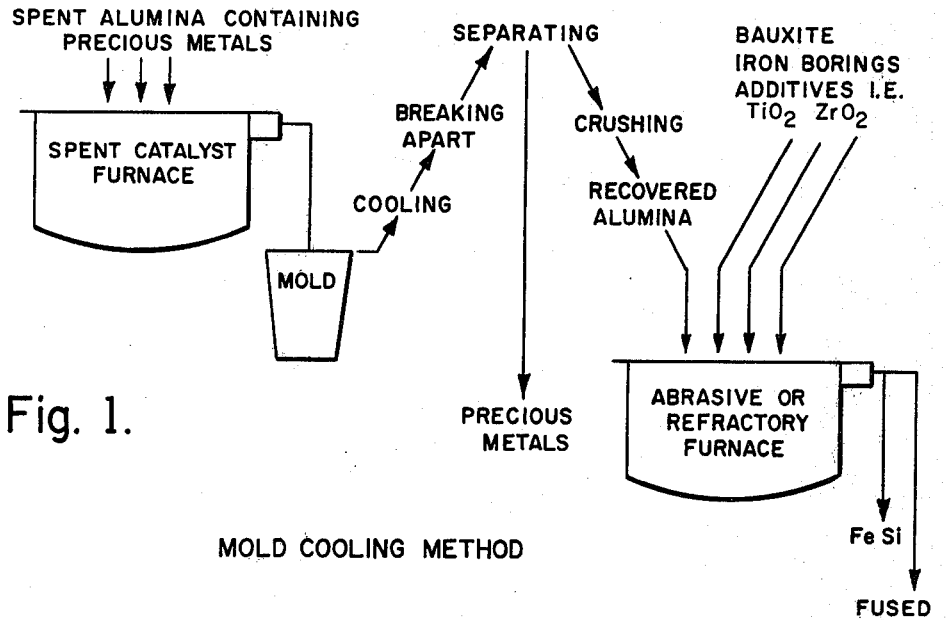
FIG. 1 is an illustration in flow sheet form of a separation method in accordance with the invention in which each batch of spent catalyst is cooled and the precious metals are separated.

In the system schematically illustrated by FIG. 1, the spent alumina-containing precious metal is melted in the spent catalyst furnace by electrical heating. The melted catalyst containing precious metals is then poured into a mold, cooled, broken apart and hand separated into the precious metal containing portions and alumina materials. The breaking apart is accomplished by means such as impact with a weighted device. The separation is accomplished by removing pieces containing the reguli or nodules of precious metals which will be concentrated in the lower portion of the molded piece after cooling. The reguli containing precious metals are then further treated to concentrate the reguli and the alumina is further crushed to be suitable for use as feed stock in an abrasive or refractory electrical furnace. The abrasive or refractory furnace produces fused alumina and generally ferrosilicon as raw bauxite is fed in addition to the recovered alumina. The method of FIG. 1 is not energy efficient in that the alumina material must be heated to the melting point of about 2100° C. twice prior to forming of the finished article. However, the process would be economical if the concentration of the palladium, platinum or other precious metal material was relatively high.

Figure 2:
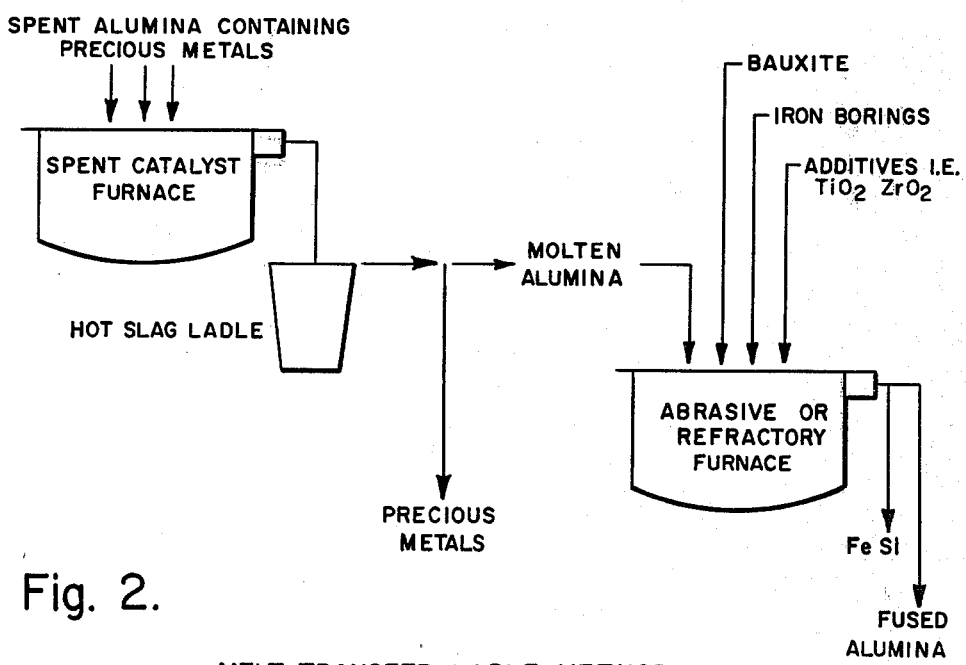
FIG. 2 is an illustration in flow diagram form of a process in accordance with the invention in which molten alumina is transferred from the spent catalyst furnace to an abrasive or refractory forming furnace and the valuable metals are periodically recovered.

The system as exemplified by FIG. 2 utilizes the spent catalyst furnace to melt the spent alumina-containing precious metal. The molten alumina is poured from the furnace into a hot slag ladle, transferred to the abrasive or refractory furnace and poured into that furnace while molten. Then further, bauxite or composition adjusting materials are added and then fused alumina product is poured from this furnace for molding in complete form as a refractory or into molds which cool at a desired rate to form a particular size crystal for abrasive use. The precious metals are periodically poured into the hot slag ladle for pouring into molds or directly into a mold from the furnace for cooling and recovery. The steps of pouring the molten alumina from the spent catalyst furnace for transport to the abrasive or refractory furnace in the hot slag ladle generally would be performed numerous times prior to the deep pour of the precious metals. This process as exemplified by FIG. 2 may be expected to result in an energy recovery of about 80% of the energy required to produce the molten alumina from the spent alumina containing catalyst. Further, by concentration of a larger portion of reguli in the bottom of the spent catalyst furnace prior to pouring the precious metals are recovered in a relatively highly concentrated form and are easier to process and to refine into the valuable precious metals in pure form.

As illustrated in FIG. 3, a semi-continuous transfer of the molten alumina from the spent catalyst furnace is carried out. The spent catalyst furnace is charged with the spent alumina-containing precious metals. The spent alumina, containing precious metals, is heated by electric power applied to electrodes to produce the molten catalysts at about 2100° C. When a batch is molten, it is poured into a trough which leads directly to the abrasive or refractory furnace. Periodically, the spent catalyst furnace is deep poured to remove the bottom portion where the precious metals rest. The frequency of the deep pours into a mold for the precious metals would be dependent on the amount of precious metals contained in the spent catalyst. By this method, recovery of energy utilized in producing the molten catalyst may be over 95%. This process, of course, is preferred because of energy savings but may require greater capital expense because of the requirement for an upper spent catalyst furnace which may dump by a trough into a lower abrasive or refractory furnace. The transfer ladle of the second method would generally require less capital expense.

FIG. 4 illustrates an alternative method of recovering the precious metals which could be utilized in the previous methods rather than pouring of the precious metals. The embodiment shown in FIG. 4 contemplates that the furnace utilized for the spent alumina catalysts would be cooled after pouring of the refined alumina slag from the top of the furnace. The cooled furnace bottom would then be broken and larger nodules or reguli of the precious metals would be picked out and then after a second crushing stage the precious metal would be separated by further hand picking or shaped separation with recyclable alumina being transferred back to the spent alumina furnace for further refining in the next campaign. This method also would be practiced anytime a spent catalyst furnace was shut down for rebuild. The furnace customarily utilized for melting of alumina contains an alumina bottom and edge portion called the skull which inherently in the invention process would become rich in the precious metals which are collected in the bottom of the furnace. Therefore, even if the molten precious metal is poured from the furnace into molds, the bottom would be treated for recovery of precious metals contained therein when a rebuilding of the furnace bottom was necessary.

The furnaces utilized in the electric melting of alumina slag generally comprise a steel shell which has a water cooling ring around it and further may have water sprays on the bottom. The steel shell is generally lined with graphite or carbon with thickness between about 3 inches (7.6 cm) and about one foot (30.5 cm). An alumina bottom is melted into the furnace by placing a small charge of alumina in the bottom of the furnace and melting it and allowing it to cool. During use, a shell of alumina builds up on the sides of the furnace generally called a skull. This skull in combination with the alumina bottom formed in the furnace provides protection at the extreme temperatures utilized in melting alumina. During the campaign it would be expected that the furnace bottom and skull would tend to concentrate the precious metals to some extent. Therefore, at the end of the campaign such material would be recycled in the next campaign or treated by some other process for separation of precious metals such as the leaching processes.

The instant process is suitable for recovering any precious metal which has a specific gravity when molten of greater than that of molten alumina. As used here, the term "precious metals" is defined as including the platinum group metals, platinum, palladium, irridium, osmium, rhodium, ruthenium and the non-platinum group metals gold and silver and mixtures of these materials. Preferred materials for recovery in the instant process are platinum and palladium which are the most common catalytic metals, have a high dollar value, good separation properties when heated to a molten condition and are used with alumina. These preferred metals normally contain at least small amounts of the other platinum group metals.

The spent alumina material utilized in the instant process may be any material which precipitates a precious metal when electrically heated and contains a significant amount of alumina. The preferred materials are catalysts consisting largely of alumina and the precious metals as these materials allow ease of formation into the alumina abrasives or refractory materials which are desirable materials. However, the system of the invention also could be utilized with catalysts of less pure composition. Particularly when the molten alumina-containing material is added as a smaller percentage into the abrasive or refractory furnace. By adding only a small percentage of recovered catalytic material any impurities in the alumina would be minimized by the inclusion in the larger batch. Further as the ferrosilicon is a by-product of fused alumina production from bauxite, impurities leading to production of this material would not be undesirable. Generally, it is preferred that the spent catalyst material contained greater than 70% alumina for economical recovery of alumina for use in abrasive and refractory formation.

Any type of spent catalysts containing precious metals in alumina may be utilized in the instant invention. Typical of sources of spent catalysts are auto emission control catalytic converters, catalysts from the petroleum industry, catalysts utilized in isomerization processes and catalysts utilized in hydro-processing. The catalysts preferred for the recovery method of the instant invention are those having between about 0.1% and about 0.025% of the precious metal. Such low percentages of the precious metal are most economically reprocessed by the instant method whereas other methods also may be economically utilized for greater percentages.

Any temperature at which the alumina and precious metal become molten may be utilized in the furnaces of the instant invention. Typically, the temperatures are above 1800° C. The preferred temperatures are between 2000° and 2200° C. in order to volatize impurities and obtain molten alumina.

If the spent catalytic material contains significant amounts of organic impurities; then the spent catalytic material should be roasted prior to being charged to the electric furnace previously identified as the spent catalyst furnace. If the feed material contains greater than 10% water, it is also necessary to dry or calcine the spent catalytic material. Further, since the feed to the spent catalyst furnace for use in melting with electrodes must not be all fine material it is necessary that about 80% to 90% of very fine feed materials be sintered or pelletized if less than about 60 mesh. The feed material should be pelletized to between about greater than 60 mesh (U.S. Sieve Series) and less than about 1 inch (2.5 cm). In addition to the greater than 60 mesh to 1 inch material, the feed for the electrode arc furnace should contain between about 10 and about 20% small material of between about 4 and about 60 mesh (U.S. Sieve Series). If a significant amount of silica is present, additives may be necessary to reduce the resistance of the furnace melt. Among such additives are alumina.

The electric furnace is used as both the spent catalyst furnace and the abrasive or refractory furnace. They are typically three-phase three electrode arc furnaces. It is also possible to use three-phase multi-electrode or two electrode single-phase electrode arc furnaces. The furnaces may be the pour or tapping type furnaces utilized for semi-continuous operation. The pouring type is preferred for its ease of control of the taps. However, a tapping type could be utilized with tap holes at different locations to tap the alumina material separate from the precious metals for the spent catalyst furnace and separate tap holes for the fused alumina and ferrosilicon in the abrasive or refractory furnace. A typical pouring furnace would have about 11 foot (3.3 meter) shell diameter, about 7 foot (2.1 meter) depth and about a 3 inch (7.6 cm) lining of graphite within its steel shell. The furnaces are water cooled by a ring which is around the upper edge and pours water over the outside. Water spray cooling of the bottom also is carried out. These furnaces form a shell of alumina on the inner side of the graphite. In a typical process according to the invention, such a furnace used as a spent catalyst furnace would be expected to make about 200 pours of molten alumina prior to making 1 pour of about 2000 pounds of 50% precious metals. When the material is fairly high in silica, melting temperature would be about 1850° C. The temperature for a pure alumina material is about 2100° C. and about 1900° C. with zirconia present.

The precious metal recovered is in the form of a metal about 1% to about 80% of precious metal with the other materials comprising iron, silicon, aluminum and traces of other metals depending on the feed material. The precious metal recovered also would generally have some slag of alumina on the top as the furnace could not be poured exactly to remove all alumina prior to the precious metal pour.

The system of the instant invention preferably utilizes a second abrasive or refractory furnace as the alumina material from the spent catalysts or other sources would not be of the precise composition for abrasive or refractory manufacture. Further, the campaign for the precious metal recovery furnace would generally be shorter and irregular depending on the availability of spent catalysts. Further, it would not be satisfactory to add bauxite to spent catalyst material as the presence of iron in bauxite would dilute the recovery of the precious metals. Recovery of ferrosilicon from melting the bauxite in itself is a valuable by-product. Ferrosilicon being utilized in the steel industry. Iron borings are generally added in production of abrasives or refractories in the electrode arc furnace as they drop through the melt and are thought to coagulate metallic particles which fall to the bottom of the furnace. The iron borings are particularly useful for precipitating lighter metals, such as silicon, by the iron droplets falling through the melt although there may also be some advantage with regard to the metals heavier than alumina still suspended in the molten alumina slag.

The trough utilized in the semi-continuous process of FIG. 3 may be formed of any material which does not add impurities to the material and further is capable of withstanding the about 2100° C. temperatures of the molten alumina. Typical of such materials are alumina-containing refractory cements and alumina refractories. The preferred material is graphite as it is able to withstand the extreme temperatures and does not contribute to impurities.

The invention will be understood more fully from a description of certain Examples from which the feasibility of the systems of the invention is demonstrated. Parts and percentages are by weight unless otherwise indicated. Temperatures are in centigrade unless otherwise indicated.

EXAMPLE 1

Automotive catalyst pellets already pretreated by commercial process to leach out the platinum group metals were dried and analyzed. The analysis given in Table 1 below reveals that the platinum content was less than 0.01% in the pellets.

The above material was fed to a single-phase 2 electrode arc furnace until the charge of 294 lbs. of spent catalyst was molten. The average energy input was 128 KW and the voltage was 82 volts at the secondary ran former terminals. The energy requirement per lb. of charge was 0.65 lb./KWH. No carbon was added to the furnace charge. During the operation, a steel scraper was set too deeply into the bath and a sizeable chunk of it was melted.

The furnace was shut off after all the charge was molten and the alumina pig was broken up after cooling sufficiently. The alumina slag contained 99.4% $Al_2O_3$ and was of grey color. On the bottom as, shown in Table 1, there was a metal regulus of 753 g in weight which contained 0.485% Pt and 83.2% Fe from primarily the scraper.

Even, assuming a 0.01% Pt content in the charge the Pt concentration was of an order of 48 times. In addition, no Pt was detectable in the $Al_2O_3$ slag.

TABLE I

| FEED (extracted alumina) | | SLAG | | METAL | |
|---|---|---|---|---|---|
| | % | % | PRODUCT | % |
| $Al_2O_3$ | 93.07 | 99.42 | Al | 2.20 |
| $Fe_2O_3$ | 1.40 | 0.18 | Fe | 83.23 |
| $SiO_2$ | 0.19 | 0.17 | Si | 11.40 |
| $TiO_2$ | 0.01 | — | Ti | 0.30 |
| $Na_2O$ | 0.02 | 0.04 | Cr | 0.56 |
| Pt | 0.01 | — | Pt | 0.48 |
| CaO | — | 0.05 | Pd | 0.17 |
| MgO | — | 0.04 | Cu | 0.08 |
| LOI | 5.07 | — | Ni | 0.08 |
| T.C. | 0.23 | 0.10 | T.C. | 0.76 |
| MOISTURE | 1.92 | — | | |
| TOTAL WT. | 294 lb. | Weight not determined | | |
| $Al_2O_3$ | 268 lb. | | | 753 g |
| Pt | 13.1 gms | | | 3.6 g (28% extraction) |

The conclusion from this test was that platinum group metals present in such small amounts within an oxide material can be separated from a molten bath. Therefore, extracting of precious metals from non-extracted spent catalysts used in the chemical and petroleum industry and for automotive and industrial exhaust gas purification is easily feasible. Also, leached materials, of less than 0.01% precious metal, can be treated by the invention systems to recover precious metals.

EXAMPLE 2

After Example 1 was completed, a test of 2 lots of non-leached automotive catalyst containing 0.24% and 0.38% Pt was performed. The charge consisted of two portions. The first portion being 322 lbs, contained 0.24% Pt and very little $SiO_2$. The second portion weighing 55 lbs. contained 0.38% Pt and 51% $SiO_2$. The composition of the 2 lots is given in Table II.

TABLE II

COMPOSITIONS OF SPENT ALUMINA (NONEXTRACTED ALUMINA)

| | Sample I % | Sample II % |
|---|---|---|
| $Al_2O_3$ (by difference) | 91.06 | 42.42 |
| $SiO_2$ | 0.15 | 51.44 |
| $Fe_2O_3$ | 0.05 | 0.40 |
| $TiO_2$ | 0.01 | — |
| $Na_2O$ | 0.14 | 0.40 |
| $SO_3$ | 0.12 | 0.02 |
| Pd | 0.24 | 0.38 |
| Pt, Rd, Re | Not detected | |
| T.C. | 0.36 | 0.16 |
| L.O.I. | 7.88 | 4.78 |
| Moisture | 17.15 | 1.74 |

This experiment was conducted in the same single phase 2 electrode furnace as Example 1. During melting 3 pours of alumina slag were made to the composition of which are given in Table III below. From the poured alumina slag composition it was found that a Pt recovery of 84% can be attained even without taking special precautions. These precautions would consist in making sure to have all top charge molten and allowing 5–10 minutes to let the metal droplets settle.

TABLE III

NON-ALUMINA COMPOSITION OF $Al_2O_3$ SLAG FROM FUSION I

| | POUR I % | POUR II % | POUR III % |
|---|---|---|---|
| $Al_2O_3$ | | | |
| $Fe_2O_3$ | 0.21 | — | 0.33 |
| $SiO_2$ | 0.64 | — | 0.54 |
| $TiO_2$ | 0.08 | — | 0.07 |
| CaO | 0.06 | — | 0.05 |
| MgO | 0.04 | — | 0.03 |
| $Na_2O$ | 0.07 | — | 0.04 |
| Pd | 0.04 | 0.04 | 0.07 |
| T.C. | 0.04 | | 0.04 |
| Pd yield calculated from | | | |

TABLE III-continued

NON-ALUMINA COMPOSITION OF Al₂O₃ SLAG FROM FUSION I

|  | POUR I % | POUR II % | POUR III % |
|---|---|---|---|
| Slag % | 84 | 84 | 68 |

The addition of 55 lbs. of high SiO₂ spent catalyst caused furnacing trouble as we could not increase our voltage due to equipment limitations to maintain the proper energy input within the range from 120–150 KW. Thus our test had to be interrupted.

The furnace was left to cool down and the skull section containing the bulk of the reguli was broken into pieces −1" in size. The reguli were sorted out by hand picking and their size was from 1/10 of one millimeter to 15 mm.

As a considerable amount of Pt was still left in the sorted skull pieces a second fusion was made.

The Pt recovery from the 1st and 2nd fusion are given in Table IV. The overall Pt recovery from this run was 61.86%. This was not complete recovery but indicated that the platinum was present in the skull not in the poured alumina. The calculated Pt recovery utilizing the alumina slag composition gave 84, 84 and 68%.

TABLE IV

EXTRACTION FROM NON-TREATED AUTOMOTIVE CATALYSTS

1ST FUSION

|  |  | Pd Content in g | % Pd |
|---|---|---|---|
| In: | 322 lb spent alumina | 365.15 |  |
|  | 55 lb spent alumina | 94.80 | 100 |
|  |  | 459.95 |  |
| Out: | Slag material in pours |  |  |
|  | Pour 1.69 lb (0.0004)(453.6 gm)= | 12.52 |  |
|  | 2.65 lb (0.0004)(453.6 gm)= | 11.79 |  |
|  | 3.77 lb (0.0007)(453.6 gm)= | 24.45 |  |
|  |  | 58.76 | 12.78 |
|  | Slag material in Skull |  |  |
|  | 78 lb (0.0038)(453.6 gm)= | 134.44 | 29.23 |
|  | Metal Reguli |  |  |
|  | 359 g (0.5574)*= | 200.11 | 43.51 |
|  | Total Out | 393.31 |  |
|  | Loss | 66.64 | 14.49 |

2ND FUSION

|  |  | Pd Content in g | % |
|---|---|---|---|
| In: | 78 lb (0.0039)(453.6 gm)= | 134.45 | 100 |
| Out: | Slag material in skull |  |  |
|  | 48 lb (0.0025)(453.6 gm)= | 54.43 |  |
|  | Metal Reguli |  |  |
|  | 201 g (0.4199)**= | 84.40 | 62.77 |
|  | Total Out | 138.83 |  |
|  | Overall Pd yield |  | 61.86 |

*Metal composition: Pd - 55.74%, Fe - 13.01%, Si - 16.50%, Al - 4.46%
**Metal Composition: Pd - 41.99%, Fe - 17.88%, Si - 35.40%, Al - 2.96%, T.C. - 0.06%.

This Example shows that the precious metal does concentrate in the bottom of the melting ladle and makes clear that with longer melting runs and more sophisticated recovery methods than hand picking that the precious metals recovery easily could be performed.

The above Examples are intended to be illustrative of the feasibility of the systems of the invention. They demonstrate the concentrative abilities of the melting systems even for spent catalytic materials containing minute amounts of precious metals.

While demonstrated and generally described for spent catalytic materials, the process of the instant invention also is suitable for any other alumina-containing materials which contain precious metals. For instance, the invention could be practiced with a refractory material containing minute amounts of precious metals which have been recovered from melting units utilized in the precious metals industry. Further, the system of the invention could be practiced with other methods of final recovery of the precious metal than hand picking and solvent extraction. Further, it is possible that platinum or palladium alloys recovered may be useful in the composition recovered without further refining. The scope of the invention is defined by the claims following.

What is claimed is:

1. A method of recovering precious metal from spent alumina material comprising melting in a furnace spent alumina material containing precious metal, removing molten alumina from the top of the melted material, allowing the lower portion of the melt to cool and recovering concentrated precious metal from the lower cooled portion.

2. The method of claim 1, wherein the steps of melting and removing the molten alumina are performed a plurality of times prior to cooling said lower portion.

3. The method of claim 1, wherein said lower portion is poured from said furnace prior to cooling.

4. The method of claim 1, wherein said spent alumina material comprises spent catalyst comprising between about 0.01% and about 0.2% precious metals.

5. The method of claim 1, wherein said precious metals consist essentially of platinum, palladium, iridium, osmium, rhodium, ruthenium, gold and mixtures thereof.

6. The method of claim 1, wherein said removing molten alumina comprises pouring the material into a means for delivery of said molten material to a second furnace.

7. The method of claim 6, wherein said means for delivery is a trough.

8. The method of claim 6 wherein said means for delivery is a transport ladle.

9. The method of claim 6, wherein said molten carrier material in said second furnace is utilized in forming of alumina abrasives or refractories.

10. The method of claim 1, wherein said spent alumina comprises greater than about 70% alumina.

11. The method of claim 1, wherein said spent alumina has been leached for precious metal recovery.

12. The method of claim 9, wherein additives are added to the second furnace to adjust the composition.

13. The method of claim 1, wherein said melting is at greater than 1800° C.

14. The method of claim 1, wherein said spent alumina comprises spent refractory materials.

15. The method of claim 2, wherein said lower portion is poured prior to cooling.

16. The method of claim 15, wherein said lower portion comprises a precious metal alloy.

* * * * *